(No Model.)

F. A. COULSON.
CHILD'S SEAT FOR BICYCLES.

No. 530,160. Patented Dec. 4, 1894.

WITNESSES
D. H. Bradford
F. Clough

INVENTOR
Fred A. Coulson
By Parker & Burton,
Attorneys.

THE NORRIS PETERS CO., PHOTO-LITHO., WASHINGTON, D. C.

UNITED STATES PATENT OFFICE.

FRED A. COULSON, OF DETROIT, MICHIGAN.

CHILD'S SEAT FOR BICYCLES.

SPECIFICATION forming part of Letters Patent No. 530,160, dated December 4, 1894.

Application filed June 2, 1894. Serial No. 513,268. (No model.)

*To all whom it may concern:*

Be it known that I, FRED A. COULSON, a citizen of the United States, residing at Detroit, county of Wayne, State of Michigan, have invented a certain new and useful Improvement in Children's Seats for Bicycles; and I declare the following to be a full, clear, and exact description of the invention, such as will enable others skilled in the art to which it pertains to make and use the same, reference being had to the accompanying drawings, which form a part of this specification.

This invention relates to children's seats to be attached to bicycles, and has for its object an improvement in that class of children's seats which are arranged to be attached to the safety bicycle in front of the rider, in a position to carry a child.

The seat which forms the object of this invention can be readily and rapidly attached to and detached from any form of bicycle now in use, and is so arranged that it holds the child safely between the arms of the rider in a position where he can be guarded and protected in case of any accident happening either to the bicycle or to the rider. It is also so arranged that the child cannot by any possibility escape from the seat, so long as the bicycle remains upright and the seat in position, and it is secured to the bicycle by a single buckle which acts in conjunction with certain hooks upon the framework of the seat and other parts which rest upon the cross bar of the handles.

Figure 2:
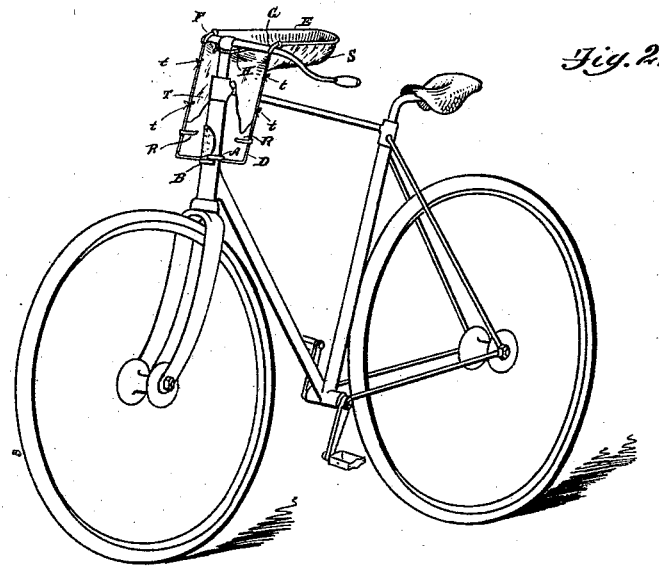
Figure 1:
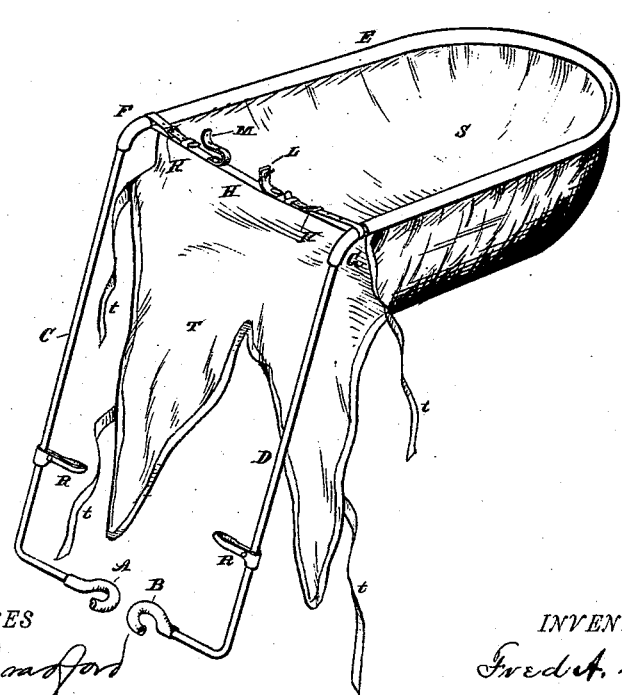

In the drawings, Figure 1 shows the seat in perspective, detached from the bicycle. Fig. 2 shows it in position on a bicycle.

The frame of the seat is made from a single bar or rod of metal, the ends A and B of which are bent into hooks that nearly close into eyes. Each one of the hooks, A, B, is preferably provided with a covering or guard of rubber or some similar material, which will prevent the hook from scratching or injuring the post of the bicycle. The hooks A and B have a curvature such that they fit quite closely around the ordinary post of bicycles. From the hook A the bar extends a short distance in a direction that would be horizontal when the seat is mounted in place, then bends upward for a proper distance,—ten to fifteen inches; it is then bent backward and looped or curved into a bow form, bent downward for a distance equal to the upward distance, C, first mentioned, and bent inward horizontally and terminates with the second hook B.

The curvature between what may be termed the uprights C and D and the seat frame proper or loop E, is an easy bend, as shown at F and G; and at the bends F and G the wire is again guarded by a covering of rubber or some suitable material which will prevent the rod from abrading the handle bar.

The two branches C and D of the seat are connected just below the curves F and G by a strap H, and this strap is secured to the two rods in any suitable manner, as (in the drawings) by turning the ends of the strap around the rods and securing the free ends through buckles K K that are fastened to the strap. Near the middle point of the strap H is, on one side of the middle point, a buckle L, and on the other side of the middle point, a free end of a strap, M.

To the looped or bowed part E is secured a bagging seat of canvas or other similar material, S, and the front part of the canvas drops down and forms an apron T, which may preferably be provided with a number of tapes, t, by which the edges of the apron may be secured to the standards of the seat after the child has been placed in position.

This seat is secured to the bicycle by placing it thereon with the curved parts F and G above and resting on the handle bar of the bicycle, after which the hooks A and B are hooked around the standard from the back, one of the hooks being above the other. The loose end M, at the middle of the strap H, is then buckled into the buckle L, with the body part of the strap on one side, and the loose end M of the strap on the other side, of the handle bar. Generally, there is in the handle bar of bicycles a curve on the handle bar at each side of the standard a short distance therefrom, such that the weight of a child sitting on the seat will tend to draw the frame of the seat outward rather than inward, the tendency being to draw the seat down along the curve of the handle bar; or, even if the bar be straight, the seat will be secured in place, as the entire weight of the child rests on the curved parts F and G, and not on the hooks A and B. There is of course a tendency to push the lower ends of the bars and the lower ends of the standards C and D and the hooks A and B forward on the post; but this does not tend to disengage the hooks from the post, but on the contrary tends to fasten them more tightly.

At suitable places on the standards C and D are secured foot rests R.

In making the frame, I spread the bottom of the standards considerably, so that when the eyes are brought into engagement with the post they are held tightly against the same by the spring tension of the standard which tends to spread them.

What I claim is—

1. In combination with the steering post and handle bar of a bicycle, a seat frame comprising a bar having the bends F and G, the loop E, the downward extending branches C, D, terminating in hooks A and B, substantially as described.

2. The combination of a seat frame adapted to rest over the handle-bar of a bicycle, provided with a seat supporting loop behind the handle-bar and with depending hook terminated arms, a strap extending from one side of the frame to the other and provided with a centrally located buckle and strap end adapted to engage the post, substantially as described.

3. The combination of a seat-frame adapted to rest over the handle-bar of a bicycle and provided with a backward extending seat supporting loop, and with depending hook terminated arms, a sagging seat and aprons dropping therefrom, substantially as described.

4. The combination of a seat frame adapted to rest over the handle-bar of a bicycle, and provided with a backward extending seat supporting loop, and with depending hook terminated arms, a sagging seat and aprons dropping therefrom, and means for securing the aprons to the depending arms, substantially as described.

5. In a bicycle seat the combination of a frame adapted to rest over the handle-bar, and to be spread by the curve thereof, a strap adapted to prevent too great spread of the seat, the hook terminated clasping arms, adapted to clasp the handle post and to be held in tight engagement therewith by the spreading action of the handle-bar, substantially as described.

In testimony whereof I sign this specification in the presence of two witnesses.

FRED A. COULSON.

Witnesses:
J. DOUGLAS MOE,
F. CLOUGH.